June 13, 1961 M. H. MURPHY 2,988,711

SINGLE SIDEBAND GENERATOR

Filed March 20, 1959 3 Sheets-Sheet 1

INVENTOR:
M. H. Murphy

By Smyth & Roston

Attorneys

June 13, 1961 M. H. MURPHY 2,988,711

SINGLE SIDEBAND GENERATOR

Filed March 20, 1959 3 Sheets-Sheet 2

INVENTOR.
M. H. Murphy

By Smyth & Roston

Attorneys.

Phase-shift Characteristics of Network A1

INVENTOR:
M. H. Murphy
By Smyth & Roston
Attorneys.

United States Patent Office 2,988,711

Patented June 13, 1961

2,988,711

SINGLE SIDEBAND GENERATOR

Melvin H. Murphy, Encino, Calif., assignor to Packard-Bell Electronics, Los Angeles, Calif., a corporation of California Filed Mar. 20, 1959, Ser. No. 800,809
14 Claims. (Cl. 332—45)

This invention relates to signaling systems and, more particularly, to a system for generating a single sideband signal.

When a signal of reduced frequency is combined with a carrier signal of increased frequency to modulate the carrier signal, signals having a number of different frequencies are produced. One signal has a frequency equal to the sum of the reduced frequency and the carrier frequency. This signal is generally designated as the upper sideband. A second signal has a frequency equal to the difference between the carrier frequency and the reduced frequency. This signal is generally designated as the lower sideband. Third and fourth signals have frequencies corresponding to the reduced frequency and the carrier frequency.

The term single sideband is utilized to indicate that the spectrum of the signal resembles one of the two sidebands that are created in the more familiar process of amplitude modulation. For example, a single sideband may constitute either the first signal or the second signal mentioned in the previous paragraph. With only one of the two normal sidebands utilized, the spectrum or channel width is effectively reduced in half. Moreover, in single sideband systems, the high-powered carrier, which is essential in double sideband systems, is unnecessary so that the effective transmitted power is materially increased. Because all the carrier power can be utilized for intelligence transmission, the signal-to-noise ratio of single sideband systems is higher than for conventional double sideband systems.

There are two main types of systems which are utilized for generating single sideband signals. In one type of system, a bandpass filter having sufficient selectivity to pass one sideband and reject the other is utilized. Filter systems, however, are expensive and complex and, moreover, produce secondary modes which are transmitted with the single sideband signals. In the other type of single sideband generating system, balanced modulators are utilized to generate two double-sideband signals which are added together. The modulating signals and the carrier signals to the balanced modulator are phased in quadrature so that of the two resulting double sideband signals, one is cancelled and the other is reinforced. The reinforced double sideband signal is the desired single sideband output signal. In balanced modulator systems, both the maintenance of the quadrature phase relationship and an accurate balance of the characteristics of a number of components is critical. For example, all four of the modulator vacuum tubes must have identical characteristics. Any unbalance, therefore, between a relatively large number of factors prevents the unwanted sideband or the carrier from being cancelled.

In this manner, the level of the undesired sideband that exists in the output single sideband signal is dependent upon the rejection characteristics of either the filter in one system or the phasing networks and balanced modulators in the other system. In either of these systems, the suppression is limited.

In an illustrative embodiment of this invention, applicant achieves suppressions of unwanted sideband and of the carrier below 50 decibels and, moreover, critical components, matched transformers, filters, balanced modulators and the like are not required. Theoretically, applicant's system is perfect for suppressing the carrier and the unwanted sidebands. Filter systems, for example, are not even ideally perfect because of the generation of secondary modes by the filter.

In the illustrative embodiment, a wide band phase shifter is utilized for the audio frequency modulating signals to provide two audio components having frequencies and amplitudes similar to the modulating signals but phase displaced by 90 degrees from each other. The phase displacement is substantially constant regardless of the frequencies in the range of the audio frequency modulating signals. The carrier signal is generated by a crystal oscillator and two carrier signal components also phase displaced by 90 degrees from each other are derived from the carrier signal.

The audio frequency quadrature components are added respectively to the radio frequency quadrature components in two linear adders. The two composite signals are thereupon supplied to squaring circuits the output of which constitutes sum and difference frequency signals plus the second harmonic of the radio frequency. The sum signal frequencies are the upper sideband signals and the difference frequency signals are the lower sideband signals. The input signals to the squaring circuits are in push-pull whereas the output signals are derived from a parallel circuit arrangement in the squaring circuit. Actually, the squaring circuits are second harmonic generators which, because of the trigonometric relationship, $\sin^2 \theta = \frac{1}{2}(1-\cos 2\theta)$, function as squaring circuits. By utilizing a second harmonic generator in this manner, a carrier frequency fundamental signal is not produced and balanced modulation or filtering to remove the carrier is unnecessary.

The outputs from the two squaring circuits are introduced to a linear adder wherein the sum frequency components are cancelled since they are 180° out-of-phase and the second harmonic of the radio frequency is removed since $\sin^2 \theta + \cos^2 \theta = 1$, however, the difference frequency components are in phase and are, therefore, reinforced.

Further advantages and features of this invention will become apparent upon consideration of the following description in conjunction with the drawing wherein.

Figure 1:
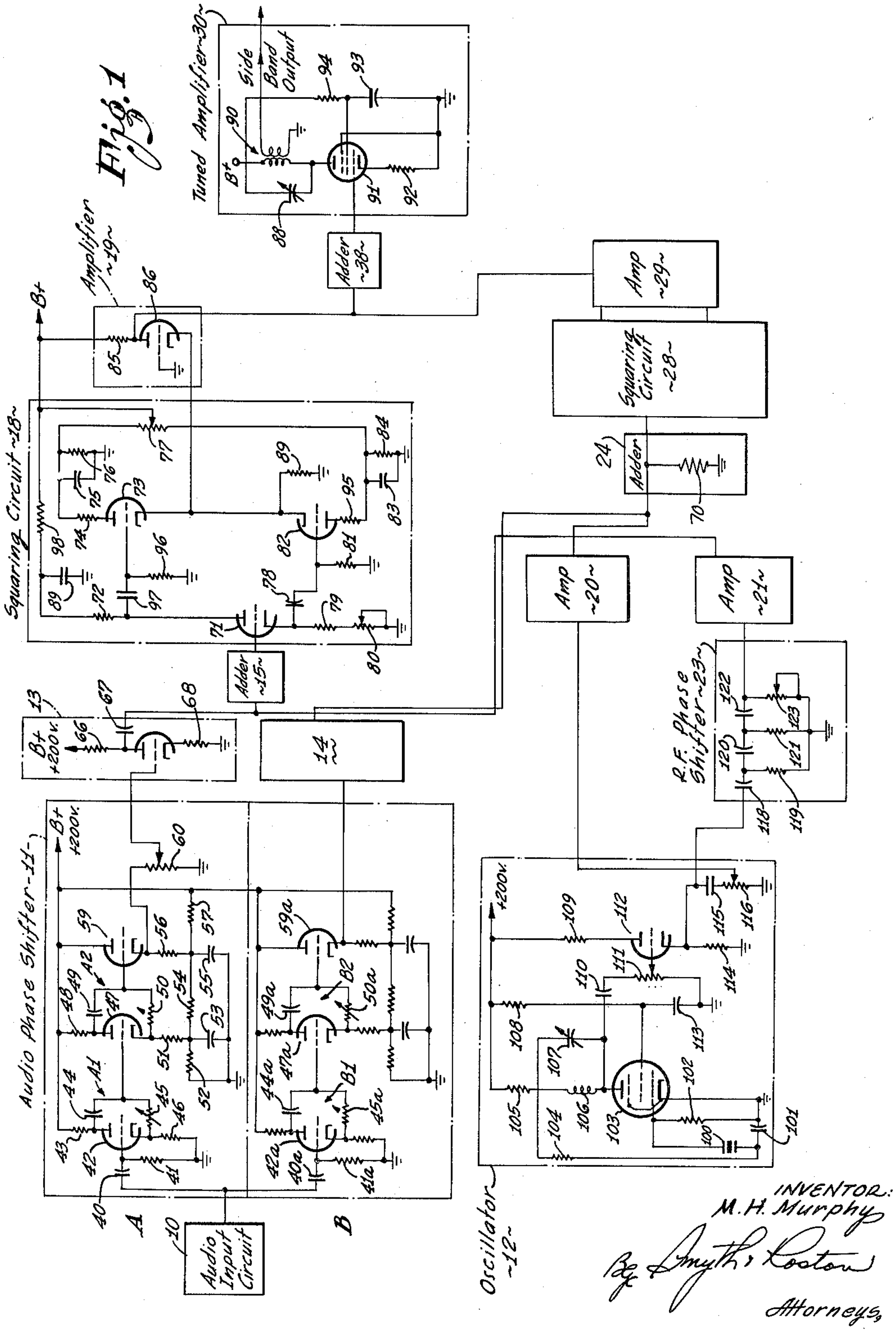
FIGURE 1 is a circuit representation of the single sideband generator of this invention.

Referring to FIGURE 1, a single sideband generator is shown which amplitude modulates audio signals from an input circuit 10 on a carrier having a suitable frequency such as 462 kilocycles per second produced by a crystal oscillator 12. The output from the generator is not the usual double sideband modulated signal but is a single sideband signal which is amplitude modulated by the audio signals from the circuit 10.

The audio signals from the circuit 10, which may have frequencies in the range from 200 to 2700 cycles per second, are supplied to an audio phase shifter 11. The phase shifter 11 produces two signals which have the same frequencies as the input signal but with a 90 degree phase angle therebetween. The 90 degree phase angle difference between the two outputs from the phase shifter 11 is substantially constant over the input frequency range. Moreover, each of the output signals has an amplitude characteristic which varies linearly with the amplitude of the output voltage and independently of the frequency.

The phase shifter 11 includes two parallel shifting arrangements A and B which are similar in configuration but some of the components have different values. The components in the parallel arrangement B have been given a reference designation which is similar to the designation of the components of the parallel arrangement A with the addition of the suffix letter *a*. For example, a tube 42 is included in the parallel arrangement A and a tube **42*a*** is included in the parallel arrangement B. Both of the arrangements A and B provide for a phase shift of the audio input signal with the phase shift provided by the arrangement A being larger than the phase shift provided by the arrangement B. The phase difference between the signals obtained from the two arrangements A and B is maintained at a substantially constant value of 90 degrees for signal frequencies in the input range of 200 to 2700 cycles per second. A constant phase difference is achieved because the arrangements A and B provide, respectively, for phase angle shifts which increase substantially linearly with the logarithm of the frequency.

Consider first the mathematical relations which follow from the assumption that the phase angles are proportional to the logarithm of the frequency, where $\phi_A$ and $\phi_B$ are the respective output phase angle shifts provided by the arrangements A and B, $f$ is the frequency and $C_a$, $k_A$, $C_b$, $k_B$ and K are all constants.

$$\phi_A = C_A + \log k_A f$$
$$\phi_B = C_B + \log k_B f$$
$$\begin{aligned}\phi_A - \phi_B &= C_A + \log k_A f - C_B - \log k_B f \\ &= C_A + \log k_A + \log f - C_B - \log k_B - \log f \\ &= C_A + \log k_A - C_B - \log k_B \\ &= K\end{aligned}$$

It is evident, therefore, that if the arrangements A and B provide respectively for phase shifts which vary with the logarithm of the frequency, the phase difference of the signals from the arrangements A and B is constant throughout the audio frequency input band. As indicated above, the audio phase shifter 11 provides for a constant phase difference of 90 degrees at the output of the phase shifter 11 for input signals from 200 to 2700 cycles per second. More particularly, the output of the arrangement A leads the output from the arrangement B by a phase angle of 90 degrees for any frequency in the input frequency range.

Referring first to the circuit arrangement A, the audio input signals from the input circuit 10 are coupled through a capacitor 40 to the control grid of the triode tube 42 which was briefly mentioned above. The control grid of the tube 42 is connected to ground by means of a conventional grid leak resistor 41. The tube 42 functions as a phase inverter to provide two signals of equal magnitude but which are 180 degrees out-of-phase with each other. One of the signals, which is provided at its cathode, is in phase with the input signals to the control grid, and the other signal, which is provided at its plate, is 180 degrees out-of-phase with the input signals at the control grid and also the signals at the cathode. The magnitude of the signals at the cathode and the plate of the tube 42 are equal because the resistance of a plate resistor 43, which is connected to the B+ 200 volt supply is equal to the resistance of a cathode resistor 46 which is connected to ground.

As each oscillation of the input signal at the control grid of the tube 42 becomes more positive, the tube 42 becomes more conductive and the potential at the cathode increases by an amount equal to the decrease of potential at the plate of the tube 42. Conversely, as the potential at the control grid decreases, the cathode potential decreases by an amount equal to the increase of plate potential. In this manner, the phase inverter tube 42 provides for two signals, one at its cathode which is in phase with the input signal, and one at its plate which is 180 degrees out-of-phase with the input signal.

The 180 degree out-of-phase signals from the tube 42 are introduced to two serially connected resistor-capacitor networks A1 and A2 which are isolated by a triode tube 47. The resistor-capacitor network A1 includes a capacitor 44 and a rheostat 47. The capacitor 44 is connected between the plate of the tube 42 and the control grid of the isolating tube 47, and the rheostat 47 is connected between the cathode of the tube 42 and the control grid of the tube 47. The resistor-capacitor network A2 includes a capacitor 49 and a rheostat 50. The capacitor 49 couples the plate of the tube 47 to the control grid of a cathode follower tube 59, and the rheostat 50 is connected between the cathode of the tube 47 and the control grid of the tube 59.

Each of the resistor-capacitor networks A1 and A2 in the arrangement A phase advances the audio signals. Since the arrangement A phase advances the audio signals by a phase shift which is 90 degrees larger than the phase shift by the arrangement B, the capacitors 44 and 49 are relatively large compared to the corresponding capacitors **44*a* and 49*a* in the arrangement B. The capacitors 44 and 49 may be similar as the rheostats 45 and 50** are utilized to adjust or tune the arrangement A.

Figure 3:
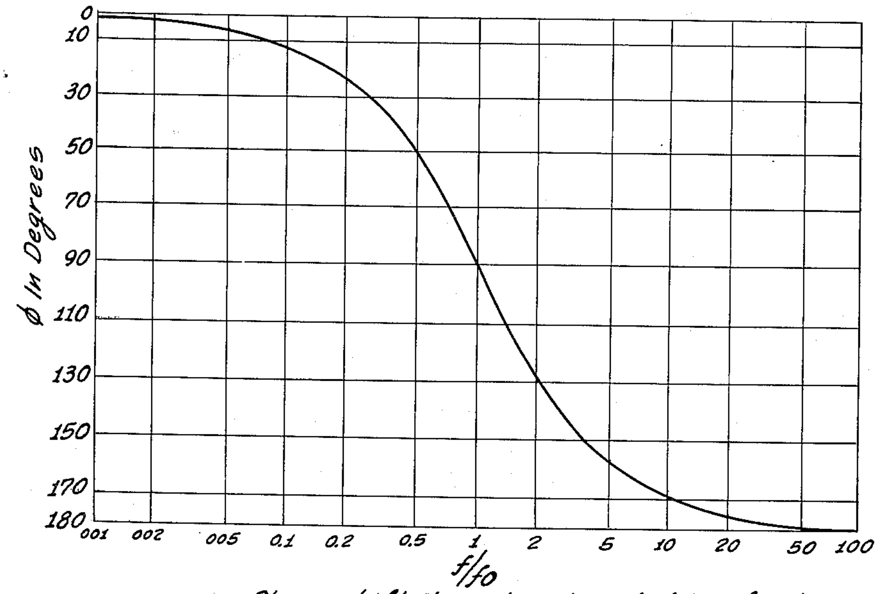
FIGURE 3 is a curve illustrating the phase shift characteristic of part of the audio phase shifter utilized in the single sideband generator of this invention.

Each of the networks A1 and B1 may be adjusted to provide together with the respective tubes 42 and 47 for any phase shift in the range from zero to 180 degrees. For example, if the rheostat 45 is adjusted to provide a short circuit from the cathode of the tube 42 to the grid of the tube 47, a zero phase shift is provided. Conversely, if the rheostat 45 is set to provide an infinite impedance, the phase shift is 180 degrees. When the resistance of the rheostat 45 is set at a value which equals the reactance of the capacitor 44 at a particular frequency, the phase shift provided by network A1 is 90 degrees. FIGURE 3 illustrates the phase shift characteristic of the network A1 where *fo* is the frequency at which the reactance of the capacitor 44 equals the resistance of the rheostat 45. The phase shift characteristic, which is plotted on semi-logarithmic coordinates, has a substantially linear portion which the phase shift varies with the logarithm of the frequency.

If the rheostat 45 is set so that the resistor-capacitor network A1 provides for a phase advance of 90 degrees for an input signal of 200 cycles per second, the phase advance provided by the network A1 is increased for frequencies over 200 cycles per second because the impedance presented by the capacitor 44 varies inversely with frequency. For higher frequencies, the reactance or impedance presented by the capacitor 44 is smaller and the phase advance is, therefore, larger. Assuming, for example, that the input signal is at a frequency of 200 cycles, the phase advance signal to the control grid of the isolation tube 47 is, therefore, 90 degrees in advance of the phase of the 200 cycle per second input signal. The tube 47 also functions as a phase inverter to provide two signals of equal magnitude and 180 degrees out-of-phase. The signals are equal in magnitude because the resistance of the plate resistor 48, which is connected to the B+ supply, is equal to the resistance of the cathode resistor 51 which is connected by a parallel arrangement including a resistor 52 and a capacitor 53 to ground. The resistance of the resistor 51 is considerably larger than that of the resistor 52 so that the increase in potential at the cathode of the tube 47 is substantially equal to the decrease in potential at its plate.

The rheostat 50 is set so that the networks A2 provide a 90 degree phase shift at some frequency higher than 200 cycles per second. For example, assume that the rheostat 50 is set so that a 90 degree phase advance is provided at 800 cycles per second. The resistance presented by the rheostat 50 would then be four times as large as the resistance presented by the rheostat 45 which sets the network A1 to advance the phase by 90 degrees at 200 cycles per second. The curve shown in FIGURE 3 illustrates the phase shift characteristic of the network A2 as well as A1 except *fo* is now 800 cycles per second instead of 200 cycles per second. As indicated in FIGURE 3, for frequencies below 800 cycles per second, the network A2 advances the phase by a deviation less than 90 degrees and for frequencies over 800 cycles per second, it advances the phase by more than 90 degrees.

Figure 4:
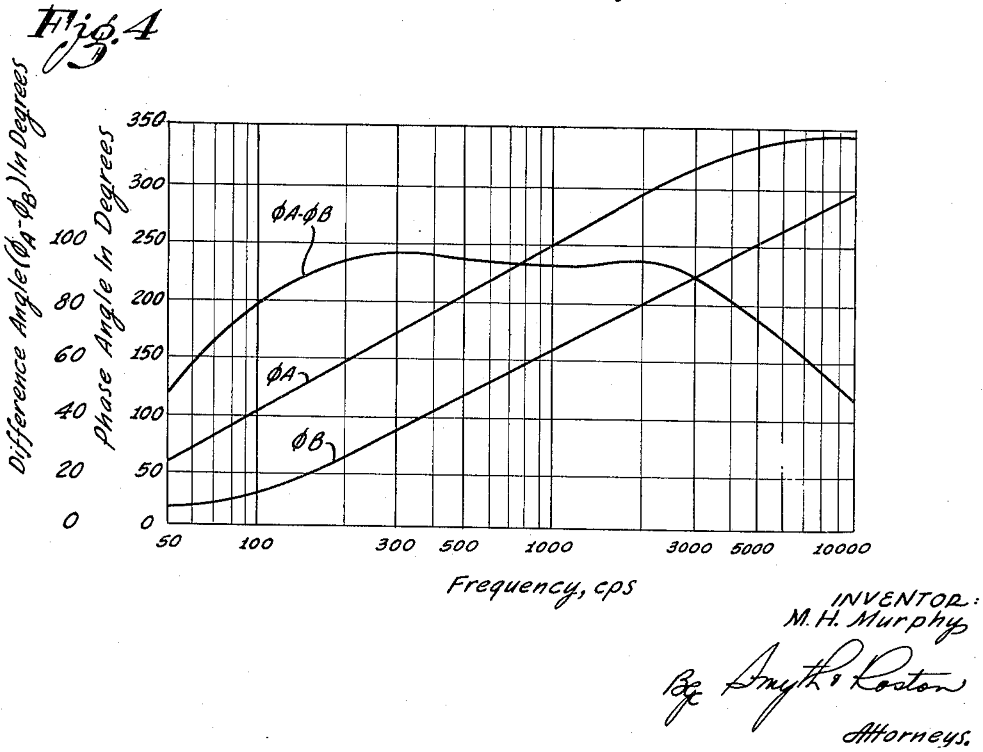
FIGURE 4 is a series of curves illustrating the operation of the audio phase shifter utilized in the single sideband generator of this invention.

With the rheostats set as assumed above, the total phase shift by the arrangement A for a 200 cycle per second signal is 90 degrees by the network A1 and some smaller angle by the network A2. For example, the phase shift by the network A2 for a 200 cycle per second input may be 60 degrees. As shown in FIGURE 4, the cumulative phase displacement $\phi_A$ for the arrangement A is 150 degrees for a 200 cycle per second input which is the sum of the 90 and the 60 degree phase displacements. As the frequency of the input signal is increased over 200 cycles per second, the phase angle $\phi_A$ increases with the increase varying linearly with the logarithm of the frequency as shown by the relatively straight line for the curve $\phi_A$ in FIGURE 4. The network $A_2$ functions to extend the frequency range over which the phase shift characteristic is linear. The linearity of the curve $\phi_A$ depends, therefore, upon the number of serially connected network A1, A2, etc. If a larger number of networks are utilized, the linear portion of the curve is extended.

As briefly described above, the phase-shifted audio signal from the network A2 is introduced to the cathode follower tube 59. The plate of the tube 59 is directly connected to the B+ supply and its cathode is connected through the serially connected resistors 56, 54 and 52 to ground. The cathode resistor 56 is also connected to ground by the capacitor 55 and to the B+ supply by the resistor 57. The positive potential from the B+ supply at the cathode of the tube 59 compensates for the grid bias at the tube 59 due to its direct connection through the rheostat 50 to the cathode of the tube 47. The capacitor 55 and a capacitor 53, which is connected between the cathode resistor 51 and ground, prevent degeneration in the respectively connected cathode circuits due to signals across the cathode resistors.

The output signals from the cathode follower tube 59 are provided from its cathode through a potentiometer 60 as the output of the arrangement A of the phase shifter 11. The arrangement B of the phase shifter 11 is similar to the arrangement A except that the capacitors **44*a* and 49*a* are smaller as the networks B1 and B2 are set to provide substantial phase displacements at the higher frequencies. For example, the rheostat 45*a* may be set so that the network B1 provides for a 90 degree phase shift at 2,000 cycles and the rheostat 50*a*** may be set so that the network B2 provides for a 90 degree phase shift at 1,500 cycles.

At frequencies in the range between 200 and 800 cycles, the arrangement B provides for a relatively small phase shift. As shown in FIGURE 4, at 200 cycles per second $\phi_B$, the phase displacement provided by the arrangement B is approximately 60 degrees so that the phase difference between the signals from the arrangement A and arrangement B is 90 degrees. As also illustrated in FIGURE 4, as the frequency increases, both arrangements A and B increase the phase shift of the audio input signals with the difference between the two displacements remaining relatively constant at 90 degrees.

The output from the tube **59*a* is provided directly to an amplifier 14 whereas the output from the tube 59, as described above, is provided through a potentiometer 60 to the amplifier 13. The potentiometer 60** is utilized to adjust for any differences in amplitude between the signals from the arrangements A and B. The output from the arrangement A is illustrated by a curve *f* in FIGURE 2, and the output from the arrangement B, which lags the output from the arrangement A by 90 degrees is illustrated by the curve *b* in FIGURE 2.

The amplifiers 13 and 14 to which the two 90 degree out-of-phase signals from the arrangement A and B are respectively provided, are similar with each including a tube 65 which inverts the phase of the signals. The 90 degree phase displacement, however, is maintained. The signal from arrangement A of the phase shifter 11 is introduced to the control grid of the tube 65. The cathode of the tube 65 is connected to ground through the cathode resistor 68 and the plate is connected to the B+ supply through the plate resistor 66. The amplified output of the tube 65 in the amplifier 13 is coupled through a capacitor 67 to an adder 15. The amplified output from the amplifier 14 is introduced to an adder 24 which is similar to the adder 15.

Figure 2:
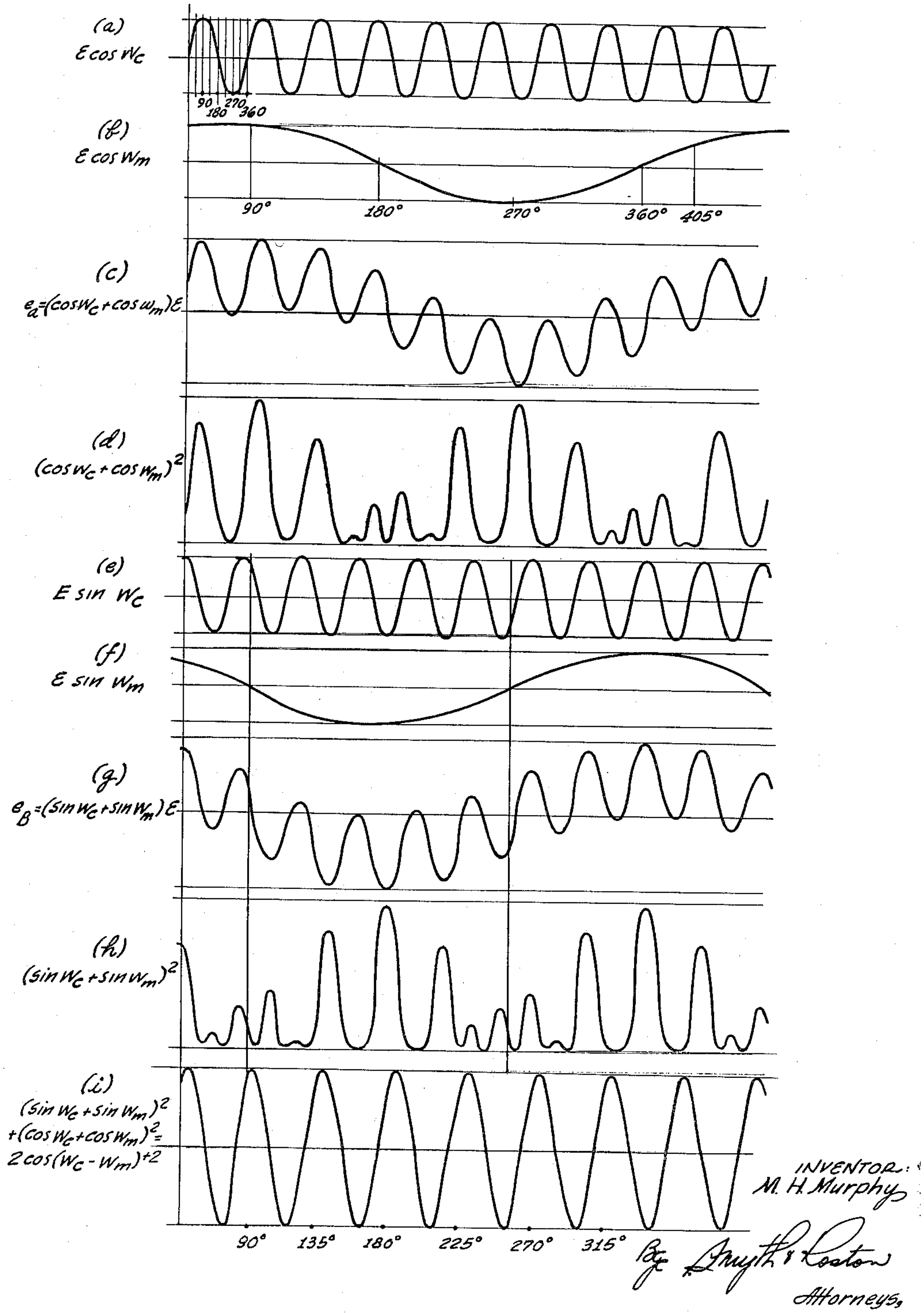
FIGURE 2 is a series of curves illustrating the various functional operations which take place in the single sideband generator of this invention.

The adders 15 and 24 each include a grounded resistor 70 across which the signals from the amplifiers 13 and 14 are respectively provided. In addition to the audio signals from the amplifiers 13 and 14 to the adders 15 and 24, a 462 kilocycle carrier signal is also provided to each of the adders 15 and 24. The carrier signals are generated by a crystal oscillator 12 which provides sinusoidal signals at a frequency of 462 kilocycles per second. The carrier signal generated by the oscillator 12 is illustrated in FIGURE 2, curve *a*. The frequency stability of the oscillator 12 is very high because a piezoelectric quartz crystal 100 is utilized to control the oscillating frequency. The crystal 100 is connected to the control grid of a pentode tube 103 and by a capacitor 101 to ground. The control grid of the tube 103 is also connected by a resistor 102 to ground.

The oscillator 12 is a tuned-grid, tuned-plate oscillator with the resonant circuit connected to the plate being tuned to a frequency which is somewhat higher than that of the crystal 100 which forms the resonant circuit connected to the grid. The plate of the tube 103 is connected to an inductor 106 and, by means of an adjustable capacitor 107 and a resistor 104, to the crystal 100. With the resonant frequency of the plate circuit being higher than that of the crystal 100, the reactance in the plate circuit is inductive at the crystal resonant frequency. The amplitude of the oscillator is determined by the amount of inductive reactance in the plate circuit and by the grid-plate tube capacity. The adjustable capacitor 107 supplements the grid-plate tube capacity to provide for relatively large amplitude oscillations.

The cathode of the tube 103 is directly connected to ground and to the suppressor grid, and the screen grid is connected to the B+ supply by a resistor 108 and by a capacitor 113 to ground. Plate potential is provided from the B+ supply through a resistor 105 and the inductor 106. The 462 kilocycle waves from the plate of the tube 103 are coupled through a capacitor 110 and a potentiometer 111 to a cathode follower tube 112 which isolates the oscillating section including tube 103 of the oscillator 12. The plate of the tube 112 is connected to B+ supply through the resistor 109 and the cathode of the tube 112 is connected to ground through the resistor 114. The output of the cathode follower tube 112 is coupled from its cathode through a capacitor 115 to a 90 degree phase shifter 23 and also from the capacitor 115 through a potentiometer 116 to an amplifier 20.

The phase shifter 23 is sharply tuned to provide a 90 degree phase shift for the 462 kilocycle signals from the oscillator 12. The audio phase shifter 11, as described above, is considerably more complicated because the 90 degree phase shift is required over the relatively wide audio frequency band from 200 to 2700 cycles. When the phase shift is required only for a specific frequency, the relatively simple arrangement included in the phase shifter 23 may be utilized. The phase shifter 23 includes three serially connected capacitors 118, 120 and 122, the terminals of which are coupled respectively through the resistors 119 and 121 and the rheostat 123 to ground. The 90 degree phase shifted signals from the phase shifter 23 are coupled through the amplifier 21 to the adder 15 which was described above.

The amplifier 21 and the amplifier 20, to which the unshifted signals from the oscillator 12 are provided, are similar to the amplifier 13 which was also described above. The unshifted carrier frequency signals from the oscillator 12 are coupled through the amplifier 20 to the adder 24. Each of the adders 15 and 24, therefore, receives both an audio signal from the phase shifter 11 and a carrier signal from the oscillator 12. The adder 15 receives audio frequency signals from the amplifier 13 which are phase advanced by 90 degrees with respect to the audio signals provided through the amplifier 14 to the adder 24, and it also receives carrier frequency signals from the amplifier 21 which are phase advanced by 90 degrees with respect to the carrier signals provided through the amplifier 20 to the adder 24.

The phase displaced signals from the phase shifter 11 may be arbitrarilly designated as sine and cosine signals and the phase displaced signals derived from the oscillator 12 may similarly be designated as sine and cosine signals. If the 90 degree phase advanced signals are designated by sine functions and the others by cosine functions, the adder 15 adds the two sine functions and the adder 24 adds the two cosine functions.

The output of the adder 15 is a composite signal shown in FIGURE 2 curve *g* and the output of the adder 24 is a composite signal shown in FIGURE 2 curve C. As illustrated by curves *g* and C of FIGURE 2, each of the two composite signals is effectively an audio frequency wave modulated by a radio frequency signal.

The audio input signal is actually a combination of a number of sinusoidal signals instead of a single sinusoidal wave so that the two phase displaced signals from the phase shifter 11 may be represented by the following equations:

$$E_A=E_1 \sin(2\pi f_1 t)+E_2 \sin(2\pi f_2 t)+\ldots+E_n \sin(2\pi f_n t)$$

$$E_B=E_1 \cos(2\pi f_1 t)+E_2 \cos(2\pi f_2 t)\ldots+E_n \cos(2\pi f_n t)$$

where $E_A$ and $E_B$ are the respective output signals from the arrangements A and B; $E_1$, $E_2$ and $E_n$ and $\pi$ are constants; $f_1$, $f_2$ and $f_n$ are the component frequencies; and $t$ is the time. In FIGURE 2, only a single wave is illustrated though the same operation occurs for each frequency component of the composite audio input signal. The mathematical relations are set forth in some detail because they illustrate the effect of each of the transformations in the single sideband generator shown in FIGURE 1. The single sideband signals provided at the output of the generator are actually lower sideband or difference frequency signals and the mathematical relations indicate how the carrier frequency and the upper sideband signals are cancelled.

The above equations represent the audio input signals. The two phase displaced carrier signals may be represented by the following equations:

$$E_C=E_d \cos(2\pi f_c t)$$

and $$E_S=E_d \sin(2\pi f_c t)$$

where $E_C$ is the unshifted carrier signal to the adder 24, $E_S$ is the phase shifted carrier signal to the adder 15, $f_c$ is the 462 kilocycle carrier frequency, and $E_d$ is a constant. In FIGURE 2, the trigonometric functions are expressed in terms of radians instead of directly in frequency with $w_m$ being the frequency in radians of the audio frequency modulating wave and $w_c$ being the frequency in radians of the carrier.

The output summed signal from the adder 15 which is illustrated as curve *g* in FIGURE 2 may be represented, therefore, by the sum of the two sine functions $E_A$ and $E_S$.

$$E_A+E_S=E_1 \sin(2\pi f_1 t)+E_2 \sin(2\pi f_2 t)+\ldots+E_n \sin(2\pi f_n t)+E_d \sin(2\pi f_c t)$$

The output summed signal from the adder 24 may be represented by the sum of the two cosine functions $E_B$ and $E_C$.

$$E_B+E_C=E_1 \cos(2\pi f_1 t)+E_2 \cos(2\pi f_2 t)+\ldots+E_n \cos(2\pi f_n t)+E_d \cos(2\pi f_c t)$$

The summed sine function signals from the adder 15 are introduced to a squaring circuit 18 and the summed cosine function signals from the adder 24 are introduced to a squaring circuit 28 which is similar to the circuit 18. As shown in FIGURE 1, the squaring circuit 18 includes an inverter tube 71 which drives two triodes 73 and 82 connected in a parallel circuit arrangement which may be referred to as a push-push arrangement. A push-push arrangement differs from a push-pull arrangement in that the fundamental and odd harmonics are cancelled instead of the even harmonics.

The signals from the adder 15 are introduced directly to the control grid of the inverter tube 71. The cathode of the tube 71 is coupled electrically through a resistor 79 and a rheostat 80 to ground and the plate of the tube 71 is connected through a resistor 72 and a resistor 98 to the B+ supply. The 180 degree out-of-phase signals from the cathode and plate of the tube 71 are coupled respectively through the capacitors 78 and 97 to the control grids of the tubes 82 and 73. The control grids of the tubes 82 and 73 are coupled electrically through conventional grid leak resistors 81 and 96 to ground. The input signals, therefore, to the tubes 82 and 73 are effectively in push-pull being 180 degrees out-of-phase. The output signals, however, from the tubes 82 and 73 are provided in parallel from their jointly connected cathodes to the cathode of a tube 86 in an amplifier 19. The output signals are developed across a cathode resistor 89, and plate potential is provided for the tubes 82 and 73 from the B+ supply through a potentiometer 77 and the respectively connected resistors 74 and 85. A parallel filter circuit, including a grounded capacitor 75 and a resistor 76, is connected to the junction between the resistor 74 and the potentiometer 77 in the B+ supply path to the plate of the tube 73. A similar grounded parallel circuit is provided in the plate supply path for tube 82 which consists of a capacitor 83 and a resistor 84.

The signals which are developed across the common cathode resistor 89 are in opposition to each other so that the fundamentals and odd harmonics cancel. Due to the non-linearity of the grid input characteristics of the tubes 73 and 82, even harmonics are created which complement each other or add. If the input grid characteristics of the tubes 73 and 82 follow the square law, only the second harmonic is provided across the cathode resistor 89. Developing second harmonics of the frequencies of the signals provided to the circuit 18 is equivalent to performing the two functions of rectifying the signals and then squaring them. This correspondence is illustrated by the following trigonometric relation:

$$\sin^2 wt=\tfrac{1}{2}(1-\cos 2wt) \quad wt=2\pi ft$$

In this manner, if a portion of the input grid characteristics of the tubes 73 and 82 follow exactly the square law and they are operated along that portion of the characteristic, only the second harmonics are provided so that the circuit 18 is a perfect squaring circuit arrangement. The input grid characteristics of the tubes 73 and 82 may actually be selected to very closely correspond with the square law so that the resultant error is extremely small. The resultant error permits some of the even harmonics above the second harmonic also to appear across the cathode resistor 89. The resultant error due to the variation of the grid input characteristics from the square law does not, however, result in the appearance of any of the fundamental or odd harmonics frequencies because the variation would be identical for both of the tubes 82 and 73. The fundamental and odd harmonics, therefore, cancel even if the input characteristics do not exactly follow the square law. As described above, the signal from the adder 15 to the squaring circuit 18 may be represented by the following formula:

$$E_1 \sin (2\pi f_1 t)+E_2 \sin (2\pi f_2 t)+ \ldots E_n \sin (2\pi f_n t) +E_s \sin (2\pi f_s t)$$

If this formula is squared, a formula representing the output signals from the squaring circuit 18 results:

$$E_A=E_1^2 \sin^2 (2\pi f_1 t)+ E_2^2 \sin^2 (2\pi f_2 t)+ \ldots E_n^2 \sin^2 (2\pi f_n t)+ 2E_1E_2 \sin (2\pi f_1 t)+2E_1E_n \sin (2\pi f_1 t) \sin (2\pi f_n t) +2E_2E_n \sin (2\pi f_2 t) \sin (2\pi f_n t)$$

The output from the squaring circuit 28 is similar to that from the squaring circuit 18 except that each of the terms of the formula is a cosine function instead of a sine function. Merely substituting the symbol cosine for the symbol sine in the above equation changes the equation to represent the output of the squaring circuit 28. Curves (*h*) and (*d*) in FIGURE 2 illustrate the two squared signals.

The squared signals from the circuits 18 and 28 are provided respectively to the amplifiers 19 and 29 which are similar. As indicated above, the cathodes of the tubes 73 and 82 in the circuit 18 are connected to the cathode of the triode tube 86 in the amplifier 19. The grid of tube 86 is connected to ground and the plate is connected by a plate resistor 85 to the B+ supply. The plate potential, therefore, varies inversely with the signals at the cathode. The amplified signals from the amplifiers 19 and 29 are provided to an adder 38 which may be similar to the above described adders 15 and 24. The adder 38 sums the two squared signals from the amplifier 19 and 29 and provides only a signal which represents a lower sideband for each of the audio frequency modulating components. A consideration of the mathematics involved indicates that all the terms in the equations representing the squared signals from the circuits 18 and 28 cancel when the two equations are added except for the lower sideband signals. This result follows as is hereinafter described because of the following three trigonometric relations:

(1) $\sin^2 2\pi f_1 t+\cos^2 2\pi f_1 t=1$ (2) $\sin 2\pi f_1 t \sin 2\pi f_2 t=\frac{1}{2} \cos (2\pi f_1 t-2\pi f_2 t)- \frac{1}{2} \cos (2\pi f_1 t+2\pi f_2 t)$ (3) $\cos 2\pi f_1 t \cos 2\pi f_2 t=\frac{1}{2} \cos (2\pi f_1 t-2\pi f_2 t)+ \frac{1}{2} \cos (2\pi f_1 t+2\pi f_2 t)$ All the squared terms of the equation for the output of the circuits 28 and 18 add to become constants because of the trigonometric relation 1, and the other terms become upper sideband and lower sideband terms. More specifically, when the two squared signals are added, the following equation results:

$$E=C+E_1E_2 \cos (2\pi f_1 t-2\pi f_2 t) +E_1E_n \cos (2\pi f_1 t-2\pi f_n t) +E_2E_n \cos (2\pi f_2 t-2\pi f_n t)$$

where E is the output of the adder 38, and C is a constant. The sum frequency terms such as $E_1E_2 \cos (2\pi f_1 t+2\pi f_2 t)$ which are not included in the equation, cancel as those derived from the $\sin (2\pi f_1 t) \sin (2\pi f_2 t)$ terms are negative and those derived from the $\cos (2\pi f_1 t) \cos (2\pi f_2 t)$ terms are positive as indicated above by the equations for the trigonometric relations 2 and 3. The resultant equation, therefore, for the signals at the output of the adder 38 includes only lower sideband terms.

The waveshape of the signals at the output of the adder 38 is illustrated in FIGURE 2 as curve *i*. The waveshape only represents, of course, the modulation of only one input frequency component. If the input component is 200 cycles per second, the frequency of the difference frequency or lower side-band signal at the output of the adder 38 is 462,000 minus 200 cycles per second or 461.8 kilocycles.

The single sideband signals from the adder 38 are provided to a tuned amplifier 30 which passes signals having frequencies in the lower sideband. The tuned amplifier 30 includes a pentode tube 91 the control grid of which receives the single sideband signals from the adder 38. The cathode of the tube 91 is connected to ground through a cathode resistor 92 and the suppressor grid is connected directly to ground. The tuning in the amplifier 30 is accomplished by a transformer 90, the primary winding of which is connected between the plate of the tube 91 and the B+ supply, and an adjustable capacitor 88 connected between the plate of the tube 91 and a resistor 94. The resistor 94 is connected to the screen grid of the tube 91 which is also connected to ground by a capacitor 93.

The tuning provided by the capacitor 88 and the transformer 90 is relatively flat in the band of signals between 459.3 kilocycles and 461.8 kilocycles which is the lower sideband range for the 200 through 2700 cycle per second input signals. The output from the tuned amplifier 30 is coupled through the secondary winding of the transformer 90. The lower sideband output signals may be supplied to a mixer, not shown, which heterodynes them with a higher frequency signal before transmission.

The following component magnitudes are tabulated below in order to illustrate one specific embodiment of applicant's invention:

| | | |
|---|---|---|
| Capacitor 40 | microfarads | 0.1 |
| Resistor 41 | kilohms | 120 |
| Tube 42 | | ½ 12AU7 |
| Resistor 43 | kilohms | 33 |
| Capacitor 44 | microfarads | .02 |
| Capacitor 44a | do | .005 |
| Rheostat 45 | kilohms | 0 to 100 |
| Resistor 46 | do | 33 |
| Tube 47 | | ½ 12AU7 |
| Resistor 48 | kilohms | 33 |
| Capacitor 49 | microfarads | .02 |
| Capacitor 49a | do | .005 |
| Rheostat 50 | kilohms | 0 to 100 |
| Resistor 51 | do | 33 |
| Resistor 52 | ohms | 800 |
| Capacitor 53 | microfarads | 10 |
| Resistor 54 | kilohms | 1 |
| Capacitor 55 | microfarads | 10 |
| Resistor 57 | kilohms | 17.5 |
| Resistor 56 | do | 68 |
| Tube 59 | | ½ 12AU7 |
| B+ supply | volts | +200 |
| Rheostat 60 | kilohms | 0 to 100 |
| Tube 65 | | ½ 12AU7 |
| Resistor 66 | kilohms | 47 |
| Capacitor 67 | microfarads | 0.1 |
| Resistor 68 | kilohms | 2.2 |
| Resistor 70 | do | 120 |
| Tube 71 | | ½ 12AU7 |
| Resistor 72 | kilohms | 4.7 |
| Resistor 98 | do | 1 |
| Capacitor 89 | microfarads | 4 |
| Resistor 96 | kilohms | 120 |
| Capacitor 97 | microfarads | 0.1 |
| Tube 73 | | ½ 12AU7 |
| Resistor 74 | ohms | 470 |
| Capacitor 75 | microfarads | 4 |
| Resistor 76 | kilohms | 47 |
| Potentiometer 77 | do | 0 to 10 |
| Capacitor 78 | microfarads | 0.1 |
| Resistor 79 | kilohms | 3 |
| Rheostat 80 | do | 0 to 5 |
| Resistor 81 | do | 120 |
| Tube 82 | | ½ 12AU7 |
| Resistor 95 | ohms | 470 |
| Capacitor 83 | microfarads | 4 |

| | | |
|---|---|---|
| Resistor 84 | kilohms | 47 |
| Resistor 89 | do | 1 |
| Tube 86 | | ½12AU7 |
| Resistor 85 | kilohms | 4.7 |
| Tube 91 | | 6AU6 |
| Resistor 92 | ohms | 100 |
| Capacitor 88 | microfarads, approximately | 62 |
| Resistor 94 | kilohms | 27 |
| Capacitor 93 | microfarads | 0.1 |
| Crystal 100 | kilocycles | 462 |
| Capacitor 101 | micromicrofarads | 25 |
| Resistor 102 | kilohms | 100 |
| Tube 103 | | 6AH6 |
| Resistor 104 | kilohms | 10 |
| Resistor 105 | do | 4.7 |
| Inductor 106 | millihenries | 40 |
| Resistor 108 | kilohms | 47 |
| Resistor 109 | do | 2.2 |
| Capacitor 110 | micromicrofarads | 120 |
| Potentiometer 111 | kilohms | 0 to 100 |
| Tube 112 | | ½S687 |
| Capacitor 113 | microfarads | 0.1 |
| Resistor 114 | kilohms | 1 |
| Capacitor 115 | microfarads | 0.05 |
| Potentiometer 116 | kilohms | 0 to 100 |
| Capacitor 118 | microfarads | 0.02 |
| Resistor 119 | kilohms | 10 |
| Capacitor 120 | microfarads | 0.002 |
| Resistor 121 | kilohms | 120 |
| Capacitor 122 | microfarads | 0.001 |
| Rheostat 123 | kilohms | 0 to 100 |

Although this application has been disclosed and illustrated with reference to particular applications, the principles involved are susceptible of numerous other applications which will be apparent to persons skilled in the art. For example, an upper sideband signal may readily be provided by subtracting the signals from the squaring circuits 18 and 28. The invention is, therefore, to be limited only as indicated by the scope of the appended claims.

I claim:

1. A single sideband generator, including, a source of carrier frequency, means for receiving a modulating frequency, means coupled to said source of carrier frequency and to said receiving means for providing two composite signals each consisting of signals derived from said carrier frequency source and from said receiving means, means coupled to said providing means for squaring each of said composite signals to provide upper and lower sideband signals, and means coupled to said squaring means for adding the squared signals derived from one of said composite signals to the squared signals derived from the other of said composite signals whereby the upper sideband signals are cancelled.

2. A single sideband generator, including, means for generating two carrier signals of equal frequency but phase displaced from each other by a predetermined phase angle, means for providing two audio-signals of equal frequency but phase displaced from each other by a predetermined phase angle, first means coupled to said generating means and to said providing means for adding one of said carrier signals to one of said audio signals, second means coupled to said generating means and to said providing means for adding the other of said carrier signals to the other of said audio signals, means coupled to said first adding means for squaring the added signals from said first means to generate upper and lower sideband signals and attenuate carrier frequency signals, means coupled to said second means for squaring the added signals from said second means to generate upper and lower sideband signals and attenuate carrier frequency signals, and means coupled to said first and said second mentioned squaring means for adding the squared signals whereby the lower sideband signals are reinforced and the upper sideband signals cancel.

3. In a single sideband generator, a pair of adding circuits, first means coupled to said pair of adding circuits for supplying to each of said pair of adding circuits a carrier frequency component of the same frequency but shifted in phase with respect to each other, means coupled to said pair of adding circuits for supplying to each of said pair of adding circuits a modulating frequency component of the same frequency but shifted in phase with respect to each other by the same phase shift as between said carrier frequency components, means coupled to each of said pair of adding circuits for deriving second harmonic frequencies from the summed signals from said pair of adding circuits whereby carrier frequency signals are inhibited, and means coupled to said deriving means for adding the second harmonic frequencies derived from the summed signals from said pair of adding circuits whereby sum frequency signals produced by said deriving means are cancelled.

4. A generator of single sideband radio-frequency energy, including, a pair of adding circuits; means for supplying radio frequency signals in phase quadrate but of equal frequency to said pair of adding circuits; means for applying modulating signals in phase quadrature but of equal frequency to said pair of adding circuits whereby two composite summed signals are produced; means coupled to each of said pair of adding circuits for squaring each of said composite signals by deriving the second harmonics of the frequencies of said composite signals; and means coupled to said squaring means for removing any sum frequency components produced by said squaring means.

5. A generator of single sideband signals, including, a carrier frequency source, a modulating frequency source, two squaring circuits, means coupled to said carrier frequency source and to said modulating frequency source for applying composite signals including carrier frequency components and modulating frequency components to each of said squaring circuits, and means coupled to said squaring circuits for combining the squared signals from said squaring circuits to produce single sideband signals.

6. A generator of single sideband radio-frequency energy, including, a pair of adding circuits; means for supplying radio frequency signals in phase quadrate but of equal frequency to said pair of adding circuits; means for applying modulating signals in phase quadrature but of equal frequency to said pair of adding circuits whereby two composite summed signals are produced; means coupled to each of said pair of adding circuits for squaring each of said composite signals by deriving the second harmonics of the frequencies of said composite signals; each of said squaring means having an inverter circuit for providing two sets of out-of-phase signals derived from said composite signals, and a pair of amplifying circuits coupled to said inverter circuit for individually receiving said sets of out-of-phase signals and having their outputs connected in parallel; and means coupled to said amplifier circuits in each of said squaring means for adding the squared signals provided by said squaring means, whereby only lower sideband signals are provided.

7. A generator of single sideband radio-frequency energy, including, a pair of adding circuits; means coupled to said adding circuits for supplying radio frequency signals in phase quadrature but of equal frequency to said pair of adding circuits; means coupled to said adding circuits for applying modulating signals in phase quadrature but of equal frequency to said pair of adding circuits whereby two composite summed signals are produced; means coupled to each of said pair of adding circuits for squaring each of said composite signals by deriving the second harmonics of the frequencies of said composite signals; each of said squaring means having an inverter circuit for providing two sets of out-of-phase signals and a pair of amplifying circuits coupled to said inverter circuit for individually receiving said sets of out-of-phase signals from said inverter circuit, each of said amplifier circuits having an input characteristic approximating a square law curve; and having an output circuit connected in parallel with the other one of said amplifier circuits of said squaring means; and means coupled to all of said parallel output circuits of said amplifier circuits of said squaring means for adding the squared signals provided by said squaring means whereby any upper sideband components produced in said squaring means are cancelled.

8. A generator of single sideband signals, including, a carrier frequency source; a modulating frequency source; two squaring circuits; means coupled to said carrier frequency source and to said modulating frequency source for applying composite signals including carrier frequency components and modulating frequency components to each of said squaring circuits, each of said two squaring circuits including means for providing two sets of out-of-phase signals derived from said composite signals applied thereto, and a pair of amplifying circuits coupled to said providing means, each having a non-linear input characteristic approximating a square law curve for amplifying said out-of-phase signals from said providing means; and means for combining said amplified out-of-phase signals from said amplifying circuits in each of said two squaring circuits to produce single sideband signals.

9. A single sideband generator, including, a source of carrier frequency, means for receiving a modulating frequency, means coupled to said source of carrier frequency and to said receiving means for providing two composite signals each consisting of signals derived from said carrier frequency source and from said receiving means, means coupled to each of said providing means for generating harmonic frequencies of the composite signals, and means coupled to said generating means for combining said signals having harmonic frequencies to produce a single sideband of signals having frequencies representing the arithmetic combination of the modulating frequency and the carrier frequency.

10. The generator set forth in claim 9 wherein the signals having harmonic frequencies are additively combined to produce a single sideband of signals having frequencies representing the difference betwen the modulating frequency and the carrier frequency.

11. The generator set forth in claim 9 wherein the signals having the harmonic frequency are subtractively combined to produce a single sideband of signals having frequencies representing the sum of the modulating frequency and the carrier frequency.

12. A single sideband generator, including, a source of carrier frequency, means for receiving a modulating frequency, means coupled to said source of carrier frequency and to said receiving means for providing two composite signals each consisting of signals derived from said carrier frequency source and from said receiving means, means coupled to said providing means for squaring each of said composite signals to provide upper and lower sideband signals, and means coupled to said squaring means for combining the squared signals derived from one of said composite signals to the squared signals derived from the other of said composite signals whereby one of the upper and lower sidebands is cancelled.

13. The generator set forth in claim 12 in which the squared signals are added to obtain the cancellation of the upper sideband.

14. The generator set forth in claim 12 in which the squared signals are subtracted to obtain the cancellation of the lower sideband.

References Cited in the file of this patent

UNITED STATES PATENTS

| | | |
|---|---|---|
| 2,210,968 | Wirkler | Aug. 13, 1940 |
| 2,431,471 | Ferguson | Nov. 25, 1947 |
| 2,660,708 | Nakken | Nov. 24, 1953 |